United States Patent [19]

Arendt

[11] 4,361,542
[45] Nov. 30, 1982

[54] ZIRCON RETRIEVAL

[75] Inventor: Ronald H. Arendt, Schenectady, N.Y.

[73] Assignee: General Electric Company, Schenectady, N.Y.

[21] Appl. No.: 324,210

[22] Filed: Nov. 23, 1981

[51] Int. Cl.³ ............................................ C01G 25/00
[52] U.S. Cl. ........................................ 423/81; 423/82; 423/69; 423/326; 423/86
[58] Field of Search ............... 423/69, 81, 82, 326, 423/86

[56] References Cited

U.S. PATENT DOCUMENTS

| 1,796,170 | 3/1931 | Termilliger | 423/82 |
| 3,109,704 | 11/1963 | Olley | 423/81 |
| 3,849,532 | 11/1974 | Deneke et al. | 423/69 |

FOREIGN PATENT DOCUMENTS

| 223572 | 6/1925 | United Kingdom | 423/82 |
| 450053 | 7/1936 | United Kingdom | 423/69 |
| 559118 | 2/1944 | United Kingdom | 423/82 |
| 853301 | 11/1960 | United Kingdom | 423/69 |

Primary Examiner—Herbert T. Carter
Attorney, Agent, or Firm—Jane M. Binkowski; James C. Davis, Jr.; Joseph T. Cohen

[57] ABSTRACT

Zircon, $ZrSiO_4$, is retrieved from zircon sand comprised of $ZrSiO_4$ crystals and contaminants including $SiO_2$ and iron by comminuting an aqueous slurry of the sand with iron means exposing the contaminants, admixing the resulting comminuted sand slurry with concentrated nitric and hydrochloric acids producing ferric chloride in solution thereby removing its iron component, admixing the resulting suspension with a flocculating agent agglomerating the suspended particles, admixing the resulting agglomerated mass with concentrated hydrofluoric acid to dissolve its $SiO_2$ component, recovering the resulting $ZrSiO_4$, washing it with water and drying.

7 Claims, 1 Drawing Figure

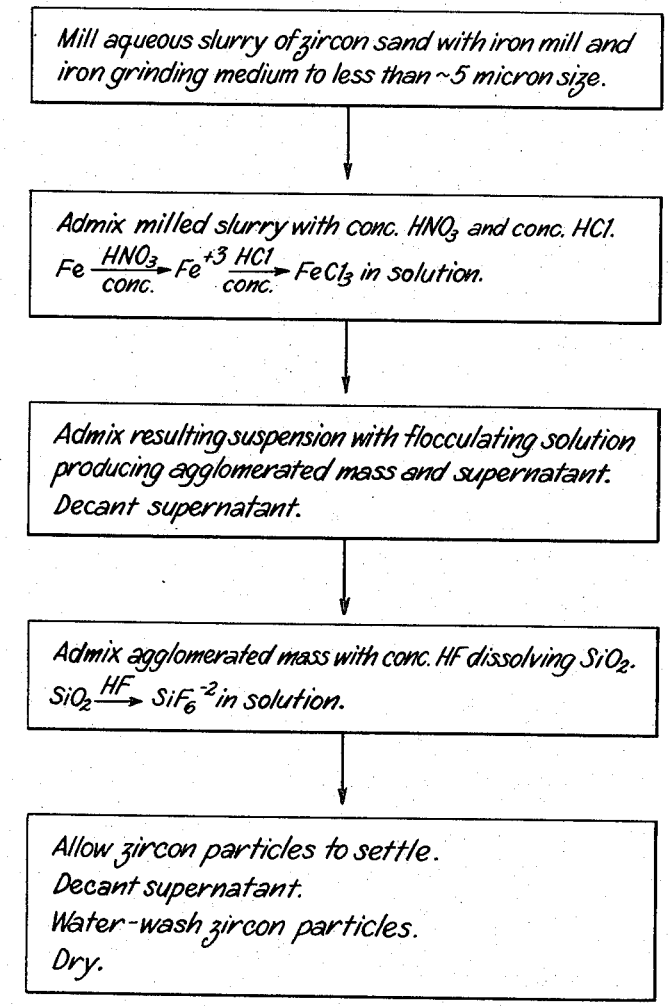

Mill aqueous slurry of zircon sand with iron mill and iron grinding medium to less than ~5 micron size.

↓

Admix milled slurry with conc. $HNO_3$ and conc. $HCl$.
$Fe \xrightarrow[conc.]{HNO_3} Fe^{+3} \xrightarrow[conc.]{HCl} FeCl_3$ in solution.

↓

Admix resulting suspension with flocculating solution producing agglomerated mass and supernatant. Decant supernatant.

↓

Admix agglomerated mass with conc. HF dissolving $SiO_2$.
$SiO_2 \xrightarrow{HF} SiF_6^{-2}$ in solution.

↓

Allow zircon particles to settle.
Decant supernatant.
Water-wash zircon particles.
Dry.

ZIRCON RETRIEVAL

The present invention is directed to retrieving small crystallite size zircon, $ZrSiO_4$, from commercially available zircon sands, a naturally occurring mineral deposit.

Zircon particles are widely distributed in rocks, but commercially important concentrations are found in sands of certain areas of the world. Zircon sand, if it can be sufficiently benefited at reasonable cost, has several potentially significant technological applications. Among these applications are its use as the arc tube material for high pressure, high temperature plasma lamps, and as structural components in high temperature, highly corrosive environments.

The chemical composition of commercial zircon sands is highly variable with the major contaminants in the form of tightly bound inclusions. Specifically, the sands are predominantly $ZrSiO_4$, with as much as 10 weight % $SiO_2$ as the major contaminant. There are smaller concentrations of various minerals, the specific composition of which is currently unknown, except that iron usually is a significant component. It is these contaminants and their potentially deleterious effect on the high temperature chemical and mechanical properties that precludes the use of these sands directly in the cited applications.

The present invention is based in part on the observation that milling of the sand preferentially fractures grains through these impurity inclusions, which renders the impurities susceptible to chemical agents which will not significantly attack the $ZrSiO_4$. Normally, milling will introduce impurities by abrasion of the grinding medium. However, if iron, i.e. steel, is used for the mill and grinding medium, it may be easily removed, without adverse effect on the $ZrSiO_4$, under conditions which will also attack the exposed second phase impurities.

Briefly stated, the present invention is a process for retrieving $ZrSiO_4$ from zircon sand, said zircon sand being comprised of $ZrSiO_4$ and a significant amount of impurities including $SiO_2$ and iron, which comprises subjecting an aqueous slurry of said zircon sand to comminuting iron means fracturing said zircon sand to an average particle size of less than about 5 microns, admixing the recovered fractured sand slurry with nitric acid and hydrochloric acid oxidizing its iron component to ferric ion and reacting said ferric ion with said hydrochloric acid producing ferric chloride in solution, the concentration and amount of said nitric acid being sufficient to oxidize said iron component to ferric ion leaving no significant amount of said iron component, the concentration and amount of said hydrochloric acid being sufficient to react with said ferric ion to form ferric chloride leaving no significant amount of free ferric ion, admixing the resulting suspension with a flocculating agent agglomerating the suspended particles therein, admixing the resulting agglomerated mass with concentrated hydrofluoric acid dissolving its $SiO_2$ component, said hydrofluoric acid being admixed in a concentration and amount sufficient to dissolve said $SiO_2$ component leaving no significant amount of said $SiO_2$ component, washing the resulting $ZrSiO_4$ product with water and drying said product, said dried product having an average particle size of less than about 5 microns and consisting essentially of $ZrSiO_4$ and containing no significant amount of impurities.

The accompanying FIGURE illustrates an embodiment of the present process.

In carrying out the present process, an aqueous slurry of the zircon sand is formed, suitable for comminuting the sand to a smaller particle size, as is customary in the comminuting or grinding art. Preferably, the slurry is formed by admixing the zircon sand with water and the resulting slurry is comminuted at ambient temperature.

Comminuting iron means are used to comminute, i.e. grind or fracture, the zircon sand. Specifically, the iron comminuting means do not introduce any impurities into the sand which are not already present, or which are not removed or removable under the conditions of the present process. As a practical matter, the iron means is steel, i.e. iron containing a hardening amount of carbon with the amount of carbon increasing to produce a steel of increased hardness. The present comminuting means can be in a conventional form such as, for example, a steel mill containing steel milling or grinding balls.

The zirconium sand is comminuted, i.e. fractured, to an average particle size of less than about 5 microns, generally an average particle size ranging from about 0.2 micron up to about 5 microns. Since the zircon crystals are very inert chemically, fracturing of the sand to such average particle size is necessary to expose the impurities sufficiently, i.e. the tightly bound contaminating inclusions to allow their removal.

When comminution is completed, the fractured sand preferably is allowed to settle out so as to remove as much water as possible by decantation to produce a significantly concentrated slurry. The resulting wet fractured zircon sand slurry is retrieved from the iron comminuting means and admixed with concentrated nitric acid and concentrated hydrochloric acid. Although these acids can be admixed with the sand slurry simultaneously or singly, it is preferable to admix the nitric acid initially with the sand slurry to oxidize its iron component to ferric ion. Such oxidation can be carried out at room temperature, but preferably, to shorten reaction time, it is carried out at a temperature ranging from about 60° C. up to 100° C., and most preferably, at a temperature approaching the boiling point of water. During this reaction there is significant effervescence of hydrogen and nitric oxide gases.

The nitric acid should be of a concentration and should be used in an amount sufficient to oxidize the iron component to ferric ion leaving no significant amount of iron remaining. Preferably, a slurry of the nitric acid and zircon sand is formed to insure intimate contact of the acid with the sand. For best results, the nitric acid is as concentrated as is feasible to increase its action on the iron component and to cut down on reaction time. Most preferably, reagent grade, i.e. 69 weight % to 71 weight %, nitric acid is used, and about three moles of such nitric acid would be required per iron atom.

Concentrated hydrochloric acid is added to chelate the ferric ion producing ferric chloride which is soluble in the acid medium. The hydrochloric acid is admixed in a concentration and amount sufficient to complex the ferric ion to produce ferric chloride, leaving no significant amount of free ferric ion. For best results, the hydrochloric acid is as concentrated as is feasible to increase reaction rate and cut down on reaction time. Most preferably, reagent grade, i.e. 36.5 weight % to 38 weight %, hydrochloric acid is used although hydrochloric acid ranging in concentration down to about 20 weight % is useful. Also, preferably, to shorten reaction time, the reaction to produce ferric chloride is carried out at a temperature ranging from about 60° C. up to 100° C., and preferably, at a temperature approaching the boiling point of water.

The volume of each acid used in the present process depends on the particular contaminant which it is to remove. Specifically, the volume of nitric acid and of hydrochloric acid required must be determined empirically since it depends on the quantity of iron present. When these acids are of reagent grade, the volume of hydrochloric acid generally ranges from about one part to about three parts for every one part of nitric acid. Generally, at temperatures of about 60° C. up to 100° C., the reaction of reagent grade nitric and hydrochloric acids to accomplish the desired solution reactions usually requires a total time of about one hour. The resulting suspension is yellow in color indicating ferric chloride in solution. Preferably, this suspension is allowed to cool to ambient temperature. This suspension does not settle out to any significant extent and requires a flocculating agent to agglomerate the suspended particles. Preferably, the suspension is diluted with water by a factor of about 4 before addition of the flocculating agent to promote removal of soluble impurities and reduce the acidity.

A flocculating agent is admixed with the resulting suspension to agglomerate, i.e. to flocculate and settle, the suspended particles. Preferably, the flocculating agent is used only in an amount necessary to settle the suspended particles. Also, preferably, the flocculating agent is added as an aqueous solution, usually about 0.1 gram to about 0.2 gram of flocculating agent per 100 grams of water being satisfactory. Any flocculating agent can be used which is removed under the conditions of the present process, or which can be removed by firing the product produced by the present process at an elevated temperature, below 1000° C., preferably below 600° C. Preferably, the flocculating agent is organic and soluble in water. Preferably, the supernatant is decanted from the wet agglomerated mass. Also, preferably, the wet agglomerated mass is washed with several comparable volumes of 0.01 M HCl, each time the product being settled with the flocculant and the supernatant being decanted and discarded. Based on simple dilution calculations, the soluble impurity levels can be conveniently reduced about 5–8 orders of magnitude.

The resulting wet agglomerated mass, preferably a resulting substantially concentrated slurry of the agglomerated mass, is washed or admixed with hydrofluoric acid in a concentration and amount sufficient to dissolve its silica leaving no significant amount thereof remaining. The volume of hydrofluoric acid required must be determined empirically since it depends on the quantity of silica present. Preferably, a slurry of the hydrofluoric acid and the wet agglomerated mass is formed to insure intimate contact with the acid and dissolution of the silica. Preferably, reagent grade, i.e, 49 weight %, hydrofluoric acid is used, although hydrofluoric acid ranging in concentration down to about 30 weight % is useful.

Upon completion of reaction with hydrofluoric acid, which frequently takes about one hour at room temperature, and which can be determined empirically by standard techniques such as wet chemical analysis, the resulting product, $ZrSiO_4$, preferably is allowed to settle and the supernatant is decanted. The product is washed with water, preferably distilled water, to remove hydrofluoric acid therefrom.

If desired, a flocculating agent may be admixed with the product slurry to flocculate and settle the particles. Preferably, the flocculating agent is used only in an amount necessary to settle the suspended particles. Also, preferably, the flocculating agent is added as an aqueous solution, usually about 0.1 gram to about 0.2 gram of flocculating agent per 100 grams of water being satisfactory. Any flocculating agent can be used which is removed under the conditions of the present process, or which can be removed by firing the product produced by the present process at an elevated temperature below 1000° C., preferably below 600° C. Preferably, the flocculating agent is organic and soluble in water. Preferably, the supernatant is decanted from the agglomerated product. Also, preferably, the agglomerated product is washed with several comparable volumes of 0.01 M HF to flush out soluble $SiF_6^{-2}$ and to prevent its hydrolysis and reprecipitation as silica, each time the product being settled with flocculant and the supernatant being decanted, followed by a number of washes with distilled water to reduce residual acid contact.

The product, $ZrSiO_4$, can be dried in a conventional manner. For example, it can be dried in air at room temperature. If necessary, it is taken to dryness and heated to 500° to 600° C. in air to thermally decompose and remove any adsorbed organic flocculant.

The dried $ZrSiO_4$ crystals have an average particle size of less than about 5 microns, and preferably, an average particle size of less than one micron. They are white in color, and free of impurities or do not contain any significant amount of impurities.

The present zircon powder has a wide variety of uses. For example, it can be hot pressed in a die at temperatures of about 1600° C. under pressures of about 4000 psi to produce a dense polycrystalline product useful as a structural material.

This invention is further illustrated by the following examples:

EXAMPLE 1

Commercially available zircon sand having an average particle size of about 100 microns containing about 12 weight % impurities was used. Specifically, the zircon sand contained about 10 weight % $SiO_2$ and about 1 weight % iron.

A one-liter steel mill containing steel milling balls was filled about ¾ full with water. One kilogram of the sand was suspended in the water, and the resulting slurry was milled at room temperature. After about 12 hours, the milling was stopped, the milled sand was allowed to settle, and the water was decanted therefrom.

The wet fractured sand in the form of an aqueous concentrated slurry was recovered from the mill and placed in a glass beaker. It had an average particle size of less than one micron. About 200 cc of reagent grade nitric acid were admixed with the fractured sand slurry forming a slurry therewith which was heated, with stirring, to about 80° C. The slurry showed considerable effervescence due to production of hydrogen and nitric acid gases indicating oxidation of iron to ferric ion. When the effervescence substantially diminished, the slurry was cooled to about 60° C. and about 600 cc of reagent grade hydrochloric acid was admixed therewith and, with stirring, the temperature of the mixture was raised to about 80° C. The resulting suspension turned deep yellow in color indicating production of ferric chloride in solution. The yellow suspension was allowed to cool to room temperature.

The suspension was diluted with distilled water by a factor of about 4. An aqueous flocculating solution comprised of 0.02 gram of anionic flocculant (a polyamide imide powder sold under the trademark Hercofloc 821) in 20 grams of distilled water was then added to the stirred suspension. The flocculating solution was used in an amount sufficient to agglomerate the suspended particles. The supernatant was decanted and the wet agglomerated mass was washed with several comparable volumes of 0.01 M HCl, each time the product being settled with the aqueous flocculating solution and the supernatant being decanted therefrom.

After the final washing with 0.01 M HCl, the flocculated mass, i.e. a substantially concentrated slurry of the flocculated mass, was placed in a polyethylene beaker and washed at room temperature with about 1000 cc of reagent grade hydrofluoric acid which was sufficient to solubilize the silica therein. The resulting product was allowed to settle out, and the supernatant was decanted.

The product, $ZrSiO_4$, was washed with several comparable volumes of 0.01 M HF. After the final wash with 0.01 M HF, the product was washed several times with distilled water to reduce acid content.

The product was taken to dryness and heated to 500° C.–600° C. in air for about one hour to decompose and thereby remove any adsorbed organic flocculant.

The resulting product was white in color and had an average particle size of less than 1 micron.

Wet chemical analysis of a portion of the product showed that it was comprised of $ZrSiO_4$ and that it did not contain any significant amount of impurities, i.e. its impurity content was less than about 0.2% by weight of the total weight of the product.

EXAMPLE 2

A portion of the $ZrSiO_4$ product produced in Example 1 were hot pressed in a die under a pressure of about 4000 psi at a temperature of about 1600° C. for about 30 minutes. The resulting product was a very dense polycrystalline material which could be useful as a structural component.

What is claimed is:

1. A process for retrieving $ZrSiO_4$ from zircon sand, said zircon sand being comprised of $ZrSiO_4$ and a significant amount of impurities including $SiO_2$ and iron, which comprises subjecting an aqueous slurry of said zircon sand to comminuting means comprised of iron means fracturing said zircon sand to an average particle size of less than about 5 microns, admixing the recovered fractured sand slurry with nitric acid and hydrochloric acid oxidizing its iron component to ferric ion and reacting said ferric ion with said hydrochloric acid producing ferric chloride in solution, the concentration and amount of said nitric acid being sufficient to oxidize said iron component to ferric ion leaving no significant amount of said iron component, the concentration and amount of said hydrochloric acid being sufficient to react with said ferric ion to form ferric chloride leaving no significant amount of free ferric ion, admixing the resulting suspension with a flocculating agent agglomerating the suspended particles therein, admixing the resulting agglomerated mass with concentrated hydrofluoric acid dissolving its $SiO_2$ component, said hydrofluoric acid being admixed in a concentration and amount sufficient to dissolve said $SiO_2$ component leaving no significant amount of said $SiO_2$ component, washing the resulting product with water and drying said product, said dried product having an average particle size of less than about 5 microns and consisting essentially of $ZrSiO_4$ and containing no significant amount of impurities.

2. The process according to claim 1 wherein said fractured sand has an average particle size which is less than one micron and said product has an average particle size of less than one micron.

3. The process according to claim 1 wherein said nitric acid is admixed initially with said fractured sand and the resulting mixture is admixed with said hydrochloric acid.

4. The process according to claim 1 wherein said nitric acid has a concentration of about 69 weight % to about 71 weight %, said hydrochloric acid has a concentration of about 36.5 weight % to about 38 weight %, and said hydrofluoric acid has a concentration of about 49 weight %.

5. The process according to claim 4 wherein said nitric acid and said hydrochloric acid are used in substantially equal amounts.

6. The process according to claim 1 wherein said flocculating agent is organic and soluble in water.

7. The process according to claim 6 wherein said flocculating agent is in the form of an aqueous solution.

* * * * *